(12) United States Patent
Higa et al.

(10) Patent No.: US 10,518,581 B2
(45) Date of Patent: Dec. 31, 2019

(54) RUBBER COMPOSITION AND TIRE (71) Applicant: BRIDGESTONE CORPORATION, Tokyo (JP)

(72) Inventors: Tomoki Higa, Yokohama (JP); Kenji Nakatani, Akishima (JP)

(73) Assignee: BRIDGESTONE CORPORATION, Tokyo (JP)

( * ) Notice: Subject to any disclaimer, the term of this patent is extended or adjusted under 35 U.S.C. 154(b) by 22 days.

(21) Appl. No.: 15/572,578

(22) PCT Filed: May 16, 2016

(86) PCT No.: PCT/JP2016/002393
§ 371 (c)(1),
(2) Date: Nov. 8, 2017

(87) PCT Pub. No.: WO2016/194316
PCT Pub. Date: Dec. 8, 2016

(65) Prior Publication Data
US 2018/0117967 A1 May 3, 2018

(30) Foreign Application Priority Data

Jun. 1, 2015 (JP) ................. 2015-111719

(51) Int. Cl.
B60C 1/00 (2006.01)
C08L 9/06 (2006.01)
C08L 15/00 (2006.01)
C08K 3/36 (2006.01)
C08L 21/00 (2006.01)
B60C 11/00 (2006.01)

(52) U.S. Cl.
CPC ............ *B60C 1/0016* (2013.01); *B60C 1/00* (2013.01); *C08K 3/36* (2013.01); *C08L 9/06* (2013.01); *C08L 15/00* (2013.01); *C08L 21/00* (2013.01); *B60C 2011/0025* (2013.01)

(58) Field of Classification Search
CPC ............ B60C 1/00; C08L 9/06; C08L 15/00
USPC ........................................ 524/216
See application file for complete search history.

(56) References Cited

U.S. PATENT DOCUMENTS

| 767,132 A | 8/1904 | Auld |
| 6,348,535 B1 | 2/2002 | Sugimoto et al. |
| 6,399,200 B1 * | 6/2002 | Sugimoto ............... C08L 15/00 428/402 |
| 2005/0222317 A1 | 10/2005 | Yatsuyanagi et al. |
| 2010/0218871 A1 | 9/2010 | Matsushita et al. |

FOREIGN PATENT DOCUMENTS

| CN | 1281486 A | 1/2001 |
| CN | 101160353 A | 4/2008 |
| CN | 101765632 A | 6/2010 |
| EP | 1 637 353 A1 | 3/2006 |
| EP | 1 854 839 A1 | 11/2007 |
| JP | 05-295174 A | 11/1993 |
| JP | 07-164822 A | 6/1995 |
| JP | 08-027313 A | 1/1996 |
| JP | 11-286578 A | 10/1999 |
| JP | 2006-282946 A | 10/2006 |
| JP | 2008-088236 A | 4/2008 |
| JP | 2014-098066 A | 5/2014 |
| WO | 02/059193 A1 | 8/2002 |

OTHER PUBLICATIONS

International Search Report of PCT/JP2016/002393 dated Jul. 26, 2016.
Extended European Search Report dated Mar. 29, 2018 issued by the European Patent Office in counterpart application No. 16802759.7.
Communication dated Jun. 5, 2019 from the China National Intellectual Property of Administration in counterpart Application No. 201680032274.6.

* cited by examiner

*Primary Examiner* — Deve V Hall
(74) *Attorney, Agent, or Firm* — Sughrue Mion, PLLC (57) ABSTRACT The rubber composition of this disclosure is a rubber composition comprising a rubber component containing 2 or more polymer components and a filler containing at least a silica, wherein: the rubber component is separated into two or more polymer phases with different peak temperatures of tan δ temperature dispersion curve; a compounding amount of the filler per 100 parts by mass of the rubber component is 30 to 130 parts by mass; 30 mass % or more of the filler exists in the polymer phase with the lowest peak temperature of tan δ temperature dispersion curve; and the filler has an average aggregate area of 2100 nm$^2$ or less.

20 Claims, 2 Drawing Sheets

RUBBER COMPOSITION AND TIRE

CROSS REFERENCE TO RELATED APPLICATIONS

This application is a National Stage of International Application No. PCT/JP2016/002393 filed May 16, 2016, claiming priority based on Japanese Patent Application No. 2015-111719 filed Jun. 1, 2015, the contents of all of which are incorporated herein by reference in their entirety.

TECHNICAL FIELD

This disclosure relates to a rubber composition and a tire.

BACKGROUND

Recently, relating to the currency of global carbon dioxide emission limits accompanying increased concerns with environment problems, requirement for fuel consumption reduction of automobiles is increasing. In order to satisfy such requirement, with respect to tire performances, reduction of rolling resistance is desired as well. Conventionally, as a method for reducing rolling resistance of tire, optimization of tire structure has been studied. However, currently performed as an ordinary method is to use one with low tan δ (hereinafter referred to as "low loss property") and excellent low heat generation as a rubber composition applied in a tire.

As a method for obtaining such rubber composition with low heat generation, considered is reduction of fillers such as carbon black, silica and the like, or use of carbon black with large particle size, etc. However, none of the methods is capable of avoiding deterioration of reinforcement performance, wear resistance and gripping performance on wet road surface of the rubber composition.

Then, for example, studied is to blend rubbers with different glass-transition temperatures (Tg), to thereby provide a rubber composition for tire tread appropriate for use in production of a tire excellent in balance of wet gripping performance and low rolling resistance, without deteriorating the wear resistance of the tire (see, e.g. PTL1).

CITATION LIST

Patent Literature

PTL 1 JPH08-27313A

SUMMARY

Technical Problem

However, there was a problem that when using the rubber composition as disclosed in PTL1, the low loss property and the wear resistance of the rubber composition cannot be both achieved.

Then, this disclosure aims to provide a rubber composition capable of achieving both the low loss property and the wear resistance at a high degree. Moreover, this disclosure aims to provide a tire capable of achieving both the low loss property and the wear resistance at a high degree.

Solution to Problem

The rubber composition of this disclosure is a rubber composition comprising a rubber component containing 2 or more polymer components and a filler containing at least a silica, wherein: the rubber component is separated into two or more polymer phases with different peak temperatures of tan δ temperature dispersion curve; a peak temperature of tan δ temperature dispersion curve of a polymer phase with a lowest peak temperature of tan δ temperature dispersion curve among the two or more polymer phases is −110° C. to −20° C.; a peak temperature of tan δ temperature dispersion curve of a polymer phase with a highest peak temperature of tan δ temperature dispersion curve among the two or more polymer phases is −10° C. to 10° C.; a compounding amount of the filler per 100 parts by mass of the rubber component is 30 to 130 parts by mass; 30 mass % or more of the filler exists in the polymer phase with the lowest peak temperature of tan δ temperature dispersion curve; and the filler has an average aggregate area of 2100 $nm^2$ or less.

Advantageous Effect

According to this disclosure, it is possible to provide a rubber composition capable of achieving both the low loss property and the wear resistance at a high degree. Moreover, according to this disclosure, it is possible to provide a tire capable of achieving both the low loss property and the wear resistance at a high degree.

DETAILED DESCRIPTION (Rubber Composition)

Hereinafter, with respect to the rubber composition of this disclosure, an embodiment is described in details.

The rubber composition of this disclosure at least contains a rubber component and a filler, and further contains other components if necessary.

Rubber Component

The aforementioned rubber component at least contains 2 or more polymer components, and is separated into 2 or more polymer phases with different peak temperatures of tan δ temperature dispersion curve of compound after compounding each polymer component.

Each polymer phase may be either a mixture of a plurality of polymers or a single polymer.

Moreover, the types of each polymer component are not limited as long as separated into 2 or more polymer phases with different peak temperatures of tan δ temperature dispersion curve of compound.

For example, when compounding polymers of types A, B and C, there is no problem if A and B are compatible with each other and C is incompatible with A and B, or A, B and C are incompatible with each other; but if all A, B and C are compatible with each other, it is impossible to form 2 polymer phases, which is unpreferable.

Figure 1:
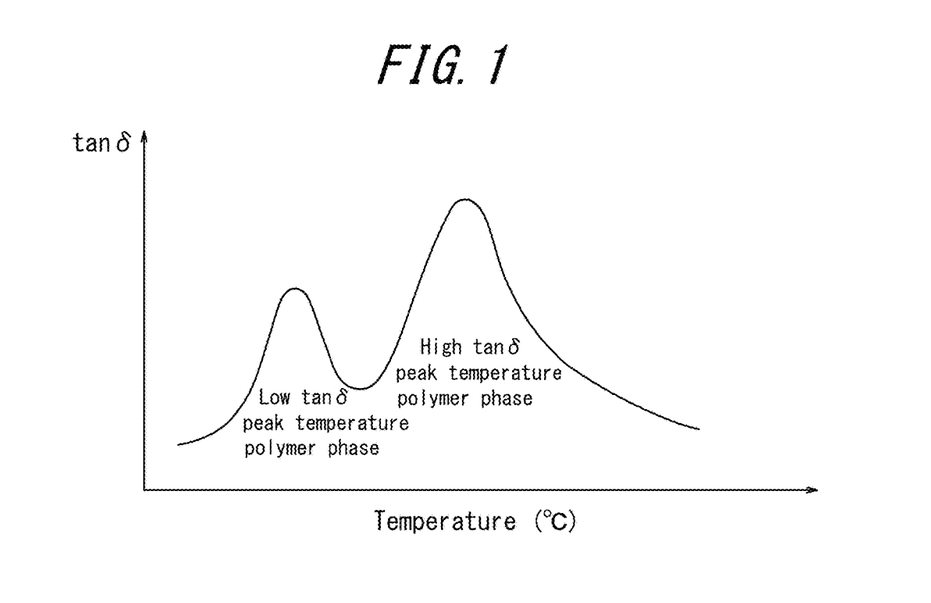
FIG. 1 illustrates a graph of a temperature dispersion curve of tan δ of a rubber component in a rubber composition of an embodiment according to this disclosure, which is a curve with two peaks.
Figure 2:
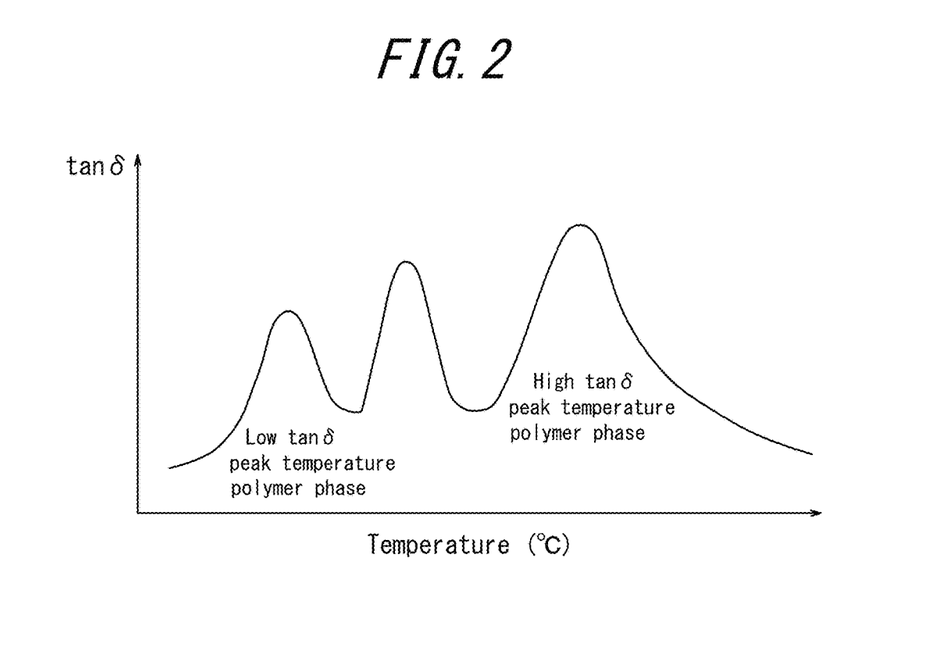
FIG. 2 illustrates a graph of a temperature dispersion curve of tan δ of a rubber component in a rubber composition of another embodiment according to this disclosure, which is a curve with three peaks.

The temperature dispersion curve of tan δ of such rubber component has two or more peaks, e.g., as illustrated in FIG. 1 and FIG. 2.

Furthermore, the temperature dispersion curve of tan δ of the rubber component may be measured at the conditions of a strain of 1% and a frequency of 52 Hz, by using, e.g., a viscoelasticity spectrometer made by Toyo Seiki Co., Ltd.

The rubber components of the rubber compositions of Examples 1 to 5 mentioned below have two peaks as illustrated in the aforementioned FIG. 1 as well.

<<Polymer Phase with Lowest Peak Temperature of Tan δ Temperature Dispersion Curve>>

The peak temperature of tan δ temperature dispersion curve of the polymer phase with the lowest peak temperature of tan δ temperature dispersion curve among the two or more polymer phases is not specifically limited and may be appropriately selected depending on the purpose as long as being −110° C. to −20° C., but is preferably −80° C. to −20° C., more preferably −60° C. to −30° C.

If the peak temperature of tan δ temperature dispersion curve is lower than −110° C., the wet performance is significantly deteriorated, and if higher than −20° C., the rubber elasticity at low temperature is significantly deteriorated. On the other hand, if within the preferable range or the more preferable range, the balance between wet performance and rubber elasticity at low temperature is excellent.

A domain circumference length of the polymer phase with the lowest peak temperature of tan δ temperature dispersion curve is not specifically limited and may be appropriately selected depending on the purpose, but is preferably 25 µm/µm² or more.

If within the preferable range, the domain circumference length is beneficial from the viewpoint of the capability of achieving excellent breaking resistance.

Here, the "domain circumference length of the polymer phase with the lowest peak temperature of tan δ temperature dispersion curve" refers to a length of an interface of polymer phases, and as for the aforementioned example, is a value obtained by ternarizing an image obtained via AFM, then removing a part corresponding to the filler, and totalizing lengths of remaining polymer phase interfaces. The calculation is performed with the removed part compensated if the filler is added into one polymer phase, and with the same remaining removed if the filler is on the interface of two polymer components (polymer phases).

A content of a polymer constituting the polymer phase with the lowest peak temperature of tan δ temperature dispersion curve with respect to the rubber component is not specifically limited and may be appropriately selected depending on the purpose, but is preferably 50 to 90 mass %.

If within the preferable range, the content is beneficial from the viewpoint of the capability of obtaining more excellent low loss property and wear resistance.

The polymer phase with the lowest peak temperature of tan δ temperature dispersion curve preferably contains a modified polymer. This is because that it is possible to achieve both the low loss property and the wear resistance at a high degree without preparing a masterbatch.

Moreover, by using a modified polymer and further preparing a masterbatch, further improvement effect of the low loss property and the wear resistance is expectable.

Modified functional groups in the modified polymer are not specifically limited and may be appropriately selected depending on the purpose, and are preferably exemplified as modified functional groups having interactivity with the filler mentioned below, etc. This is because that it is possible to improve the interactivity with the filler, and to thereby achieve both the low loss property and the wear resistance at a high degree.

In the present Specification, "the polymer phase with the lowest peak temperature of tan δ temperature dispersion curve contains a modified polymer" means not only that the polymer phase with the lowest peak temperature of tan δ temperature dispersion curve is constituted by merely a modified polymer, but also that it is constituted by a mixture of a modified. polymer and an unmodified polymer.

Here, the "modified functional groups having interactivity with the filler" refer to functional groups capable of forming covalent bonds with a surface of the filler (e.g., silica), or forming an intermolecular force weaker than covalent bond (electromagnetism forces functioning between molecules such as ion-dipole interaction, dipole-dipole interaction, hydrogen bond, Van der Waals force and the like). Functional groups with high affinity with the filler (e.g., silica) are not specifically limited, and are exemplified as nitrogen containing functional group, silicon containing functional group, oxygen containing functional group, etc.

It is preferable that the modified functional groups in the modified polymer are modified functional groups having interactivity with the filler, more preferable that the modified functional groups are nitrogen containing functional group, silicon containing functional group or oxygen containing functional group. This is because that it is possible to achieve both the low loss property and the wear resistance at a high degree more securely.

Modification efficiency in the modified polymer is not specifically limited and may be appropriately selected depending on the purpose, but is preferably 30% to 100%, more preferably 50 to 100%.

This is because that if the modification efficiency in the modified polymer is within the preferable range or the more preferable range, it is possible to achieve both the low loss property and the wear resistance at a high degree more securely.

In the case where the modified functional group is, e.g., amino group, the "modification efficiency in the modified polymer" is measured according to the following method.

By dissolving the modified polymer in toluene, and then precipitating in a large amount of methanol, amino group containing compounds which are not bonded to the modified polymer are separated from the rubber, and then dried. Polymers subjected to the present treatment are used as samples, to quantify their total amino group contents according to the "testing method for total amine values" according to JIS K7237. Next, the polymers subjected to the aforementioned treatment are used as samples, to quantify their contents of secondary amino groups and tertiary amino groups according to the "acetylacetone blocked method". O-nitrotoluene is used as a solvent to dissolve the samples, added with acetylacetone, and subjected to potential-difference titration with perchloric acid acetic acid solution. The primary amino group content is determined by subtracting the contents of secondary amino groups and tertiary amino groups from the entire amino group content, and the content of primary amino groups bonded to the polymer is determined by dividing the same with the polymer weight used in the analysis.

Moreover, regarding the tertiary amino group content, by dissolving the polymer in toluene, and then precipitating in a large amount of methanol, amino group containing compounds which are not bonded to the modified polymer are separated from the rubber, and then dried. The polymers subjected to the present treatment are used as samples, to quantify their tertiary amino group content according to the "acetylation method". O-nitrotoluene+acetic acid is used as a solvent to dissolve the samples, added with formic acid/acetic anhydride mixed solution, and subjected to potential-difference titration with perchloric acid acetic acid solution. The content of tertiary amino groups bonded to the polymer is determined by dividing the tertiary amino group content with the polymer weight used in the analysis.

The polymer constituting the polymer phase with the lowest peak temperature of tan δ temperature dispersion curve is preferably a polymer or copolymer obtained by polymerizing 80 to 100 mass % of a diene-based monomer and 0 to 20 mass % of an aromatic vinyl compound with respect to all monomer components. This is because that it is possible to achieve more excellent low loss property and wear resistance.

Further, the polymer constituting the polymer phase with the lowest peak temperature of tan δ temperature dispersion curve is preferably a modified polymer (i.e., "a modified product of a copolymer of a diene-based monomer and an aromatic vinyl compound" or "a modified product of a homopolymer of a diene-based monomer"). This is because that it is possible to further improve the low loss property and the wear resistance of the rubber composition.

The diene-based monomer used in polymerization of the polymer constituting the polymer phase with the lowest peak temperature of tan δ temperature dispersion curve is exemplified as conjugated diene compounds such as 1,3-butadiene, isoprene, 1,3-pentadiene, 2,3-dimethylbutadiene, 2-phenyl-1,3-butadiene, 1,3-hexadiene and the like, and among these, from the viewpoint of easiness to adjust the peak temperature of tan δ temperature dispersion curve of the polymer phase, 1,3-butadiene is specifically preferable. These conjugated diene compounds may be used singly or in a combination of two or more.

On the other hand, the aromatic vinyl compound used in polymerization of the polymer constituting the polymer phase with the lowest peak temperature of tan δ temperature dispersion curve is exemplified as styrene, α-methylstyrene, 1-vinylnaphthalene, 3-vinyltoluene, ethylvinylbenzene, divinylbenzene, 4-cyclohexylstyrene, 2,4,6-trimethylstyrene, etc. Among these, from the viewpoint of easiness to adjust the peak temperature of tan δ temperature dispersion curve of the polymer phase, styrene is specifically preferable. These aromatic vinyl compounds may be used singly or in a combination of two or more.

The diene-based monomer is more preferably 1,3-butadiene, and the aromatic vinyl compound is more preferably styrene. This is because that it is possible to achieve more excellent low loss property and wear resistance.

The polymerization method for obtaining the polymer constituting the polymer phase with the lowest peak temperature of tan δ temperature dispersion curve may be any one of anionic polymerization, coordination polymerization or emulsion polymerization. A modifier for obtaining the modified polymer which may be contained in the polymer phase with the lowest peak temperature of tan δ temperature dispersion curve may be either a modifier which reacts with polymerization active terminals of anionic polymerization or coordination polymerization, or an amide moiety of a lithium amide compound used as a polymerization initiator. Moreover, in emulsion polymerization, the modifier may be copolymerized as a monomer.

A molecular weight of the polymer constituting the polymer phase with the lowest peak temperature of tan δ temperature dispersion curve is not specifically limited, but if a peak molecular weight is 50,000 or more, it is possible to obtain excellent breaking resistance, and if 700,000 or less, it is possible to obtain excellent processability. Further, in order to achieve the breaking resistance, the wear resistance and the processability at a high degree, a peak molecular weight of 100,000 to 350,000 is desirable. The peak molecular weight is a peak molecular weight (Mp) measured via gel permeation chromatography (GPC), in terms of polystyrene.

The content in the rubber component of the polymer constituting the polymer phase with the lowest peak temperature of tan δ temperature dispersion curve is preferably 10 mass % or more. This is because that if the content in the rubber component of the polymer constituting the polymer phase with the lowest peak temperature of tan δ temperature dispersion curve is less than 10 mass %, the improvement effect of the dispersibility of the filler is poor, and thus the improving effect of the low loss property and the wear resistance of the rubber composition is poor.

Here, the modifier used in the modification when obtaining the modified polymer which may be contained in the polymer phase with the lowest peak temperature of tan δ temperature dispersion curve is described in the following.

The modifier is preferably a modifier containing a functional group having interactivity with the filler (e.g., silica), more preferably a modifier having at least one atom selected from silicon atom, nitrogen atom or oxygen atom, further more preferably a modifier having silicon atom and oxygen atom, or silicon atom and nitrogen atom in one molecule, most preferably a modifier having silicon atom, oxygen atom and nitrogen atom in one molecule.

From the viewpoint of high affinity with the filler (e.g. silica), the aforementioned modifier is preferably an alkoxysilane compound.

Further, the alkoxysilane compound is not specifically limited, but is more preferably an alkoxysilane compound represented with the following general formula (I).

[Formula 1]

$$R^1{}_a\text{—Si—}(OR^2)_{4-a} \qquad (I)$$

(In the formula, $R^1$ and $R^2$ independently represent a C1 to C20 monovalent aliphatic hydrocarbon group or a C6 to C18 monovalent aromatic hydrocarbon group, and in the case where a is an integer of 0 to 2 and $OR^2$ is plural, the plurality of $OR^2$ may be either identical to or different from each other. Moreover, the molecule does not contain active proton.)

Here, the alkoxysilane compound represented with the aforementioned general formula (I) is specifically exemplified as N-(1,3-dimethylbutylidene)-3-(triethoxysilyl)-1-propaneamine, tetramethoxysilane, tetraethoxysilane, tetra-n-propoxy silane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, ethyltripropoxysilane, ethyltriisopropoxysilane, propyltrimethoxysilane, pro- pyltriethoxysilane, propyltripropoxysilane, propyltriisopropoxysilane, butyltrimethoxysilane, butyltriethoxysilane, phenyltrimethoxysilane, phenyltriethoxysilane, dimethyltridimethoxysilane, methyl phenyl dimethoxysilane, dimethyldiethoxysilane, vinyltrimethoxysilane, vinyltriethoxysilane, divinyldiethoxysilane, etc.

Among these, N-(1,3-dimethylbutylidene)-3-(triethoxysilyl)-1-propaneamine, tetraethoxysilane, methyltriethoxysilane and dimethyldiethoxysilane are favorable. These may be used singly or in a combination of two or more.

From the viewpoint of high affinity with the aforementioned filler (silica), the aforementioned modifier may be a hydrocarbyloxysilane compound.

Further, the hydrocarbyl oxysilane compound is preferably as compound represented with the following general formula (II).

[Formula 2]

(II)

In the general formula (II), n1+n2+n3+n4=4 (n2 is an integer of 1 to 4; n1, n3 and n4 are integers of 0 to 3); $A^1$ is at least one functional group selected from saturated cyclic tertiary amine compound residual group, unsaturated cyclic tertiary amine compound residual group, ketimine residual group, nitrile group, (thio)isocyanate group (representing isocyanate group or thioisocyanate group; the same hereinafter), (thio)epoxy group, trihydrocarbyl isocyanurate group, dihydrocarbyl carbonate group, nitrite group, pyridine group, (thio)ketone group, (thio)aldehyde group, amide group, (thio)carboxylate group, metallic salt of (thio)carboxylate, carboxylic anhydride residual group, carboxylic halide residual group, or primary, secondary amide group or mercapto group having hydrolyzable group, and may be either identical or different when n4 is 2 or more; $A^1$ may be a divalent group forming a cyclic structure by bonding with Si; $R^{21}$ is a C1 to C20 monovalent aliphatic or alicyclic hydrocarbon group or a C6 to C18 monovalent aromatic hydrocarbon group, and may be either identical or different when n1 is 2 or more; $R^{23}$ is a C1 to C20 monovalent aliphatic or alicyclic hydrocarbon group, a C6 to C18 monovalent aromatic hydrocarbon group or a halogen atom (gluorine, chlorine, bromine, iodine), and may be either identical or different when n3 is 2 or more; $R^{22}$ is a C1 to C20 monovalent aliphatic or alicyclic hydrocarbon group or a C6 to C18 monovalent aromatic hydrocarbon group, either one of which may contain a nitrogen atom and/or a silicon atom, and may be either identical or different, or form a ring together when n2 is 2 or more; and $R^{24}$ is a C1 to C20 divalent aliphatic or alicyclic hydrocarbon group, or a C6 to C18 divalent aromatic hydrocarbon group, and may be either identical or different when n4 is 2 or more.

The hydrolyzable group in the primary or secondary amino group having hydrolyzable group or the mercapto group having hydrolyzable group is preferably trimethylsilyl group or tert-butyldimethylsilyl group, more preferably trimethylsilyl group.

Further, in this disclosure, the "C1 to C20 monovalent aliphatic or alicyclic hydrocarbon group" refers to "C1 to C20 monovalent aliphatic hydrocarbon group or C3 to C20 monovalent alicyclic hydrocarbon group".

The same goes with the case of divalent hydrocarbon group. Favorably, the aforementioned hydrocarbyloxysilane compound represented with the general formula (II) is specifically exemplified as [N,N-bis(trimethylsilyl)-(3-amino-1-propyl)](methyl)(diethoxy)silane.

The hydrocarbyl oxysilane compound represented with the general formula (II) is preferably a hydrocarbyl oxysilane compound represented with the following general formula (III).

[Formula 3]

(III)

In the general formula (III), p1+p2+p3=2 (where p2 is an integer of 1 or 2, p1 and p3 are integers of 0 or 1); $A^2$ is NRa (Ra is a monovalent hydrocarbon group, hydrolyzable group or nitrogen-containing organic group. As a hydrolyzable group, trimethylsilyl group or tert-butyldimethylsilyl group is preferable, and trimethylsilyl group is more preferable) or sulfur; $R^{25}$ is a C1 to C20 monovalent aliphatic or alicyclic hydrocarbon group, or a C6 to C18 monovalent aromatic hydrocarbon group; $R^{27}$ is a C1 to C20 monovalent aliphatic or alicyclic hydrocarbon group, a C6 to C18 monovalent aromatic hydrocarbon group, or a halogen atom (gluorine, chlorine, bromine, iodine); $R^{26}$ is a C1 to C20 monovalent aliphatic or alicyclic hydrocarbon group, a C6 to C18 monovalent aromatic hydrocarbon group, or a nitrogen-containing organic group, any one of which may contain a nitrogen atom and/or a silicon atom, and may be either identical or different, or form a ring together when p2 is 2; and $R^{28}$ is a C1 to C20 divalent aliphatic or alicyclic hydrocarbon group or a C6 to C18 divalent aromatic hydrocarbon group.

The hydrocarbyl oxysilane compound represented with the general formula (II) is preferably a hydrocarbyl oxysilane compound the represented with the general formula (IV) or (V).

[Formula 4]

(IV)

In the general formula (IV), q1+q2=3 (where q1 is an integer of 0 to 2, q2 is an integer of 1 to 3); $R^{31}$ is a C1 to C20 divalent aliphatic or alicyclic hydrocarbon group or a C6 to C18 divalent aromatic hydrocarbon group; $R^{32}$ and $R^{33}$ are independently a hydrolyzable group, a C1 to C20 monovalent aliphatic or alicyclic hydrocarbon group, or a C6 to C18 monovalent aromatic hydrocarbon group; $R^{34}$ is a C1 to C20 monovalent aliphatic or alicyclic hydrocarbon group or a C6 to C18 monovalent aromatic hydrocarbon group, and may be either identical or different when q1 is 2;

$R^{35}$ is a C1 to C20 monovalent aliphatic or alicyclic hydrocarbon group, or a C6 to C18 monovalent aromatic hydrocarbon group, and may be either identical or different when q2 is 2 or more.

[Formula 5]

(V)

In the general formula (V), r1+r2=3 (where r1 is an integer of 1 to 3, and r2 is an integer of 0 to 2); $R^{36}$ is a C1 to C20 divalent aliphatic or alicyclic hydrocarbon group or a C6 to C18 divalent aromatic hydrocarbon group; $R^{37}$ is dimethylaminomethyl group, dimethylaminoethyl group, diethylaminoethyl group, diethylaminoethyl group, methylsilyl(methyl)aminomethyl group, methylsilyl(methyl)aminoethyl group, methylsilyl(ethyl)aminomethyl group, methylsilyl(ethyl)aminoethyl group, dimethylsilylaminomethyl group, dimethylsilylaminoethyl group, C1 to C20 monovalent aliphatic or alicyclic hydrocarbon group, or C6 to C18 monovalent aromatic hydrocarbon group, and may be either identical or different when r1 is 2 or more; $R^{38}$ is a C1 to C20 hydrocarbyloxy group, a C1 to C20 monovalent aliphatic or alicyclic hydrocarbon group, or a C6 to C18 monovalent aromatic hydrocarbon group, and may be either identical or different when r2 is 2.

The modifier is preferably a hydrocarbyl oxysilane compound having 2 or more nitrogen atoms represented with the following general formula. (VI) or (VII).

[Formula 6]

(VI)

In general formula (VI), TMS is trimethylsilyl group, $R^{40}$ is trimethylsilyl group, a C1 to C20 monovalent aliphatic or alicyclic hydrocarbon group, or a C6 to 18 monovalent aromatic hydrocarbon group; $R^{41}$ is a C1 to C20 hydrocarbyloxy group, a C1 to C20 monovalent aliphatic or alicyclic hydrocarbon group, or a C6 to C18 monovalent aromatic hydrocarbon group; and $R^{42}$ is a C1 to C20 divalent aliphatic or alicyclic hydrocarbon group, or a C6 to C18 divalent aromatic hydrocarbon group.

[Formula 7]

(VII)

In the general formula (VI), TMS is a tri methylsilyl group, $R^{43}$ and $R^{44}$ are independently a C1 to C20 divalent aliphatic or alicyclic hydrocarbon group or a C6 to C18 divalent aromatic hydrocarbon group; $R^{45}$ is a C1 to C20 monovalent aliphatic or alicyclic hydrocarbon group or a C6 to C18 monovalent aromatic hydrocarbon group, and the plurality of $R^{45}$ may be identical or different.

The hydrocarbyl oxysilane compound represented with the general formula (II) is more preferably a hydrocarbyl oxysilane compound represented with the general formula (VIII).

[Formula 8]

(VIII)

In the general formula (VIII), r1+r2=3 (where r1 is an integer of 0 to 2, and r2 is an integer of 1 to 3); TMS is trimethylsilyl group; $R^{46}$ is a C1 to C20 divalent aliphatic or alicyclic hydrocarbon group or a C6 to 18 divalent aromatic hydrocarbon group; $R^{47}$ and $R^{48}$ are independently a C1 to C20 monovalent aliphatic or alicyclic hydrocarbon group or a C6 to C18 monovalent aromatic hydrocarbon group. The plurality of $R^{47}$ or $R^{48}$ may be either identical or different.

The modifier is preferably a hydrocarbyl oxysilane compound represented with the following general formula (IX).

[Formula 9]

(IX)

In the general formula (IX), X is a halogen atom (gluorine, chlorine, bromine or iodine); $R^{49}$ is a C1 to C20 divalent aliphatic or alicyclic hydrocarbon group or a C6 to C18 divalent aromatic hydrocarbon group; $R^{50}$ and $R^{51}$ are either independently a hydrolyzable group, a C1 to C20 monovalent aliphatic or alicyclic hydrocarbon group or a C6 to C18 monovalent aromatic hydrocarbon group, or alternatively, $R^{50}$ and $R^{51}$ are bonded to form a divalent organic group; $R^{52}$ and $R^{53}$ are independently a halogen atom (gluorine, chlorine, bromine or iodine), a hydrocarbyloxy group, a C1 to C20 monovalent aliphatic or alicyclic hydrocarbon group, or a C6 to C18 monovalent aromatic hydrocarbon group. $R^{50}$ and $R^{51}$ are preferably hydrolyzable groups, and as a hydrolyzable group, trimethylsilyl group or tert-butyl dimethylsilyl group is preferable, and trimethylsilyl group is more preferable.

The modifier is preferably a compound having a structure represented with the following general formulae (X) to (XIII).

[Formula 10]

(X)

-continued

[Formula 11]

(XI)

[Formula 12]

(XII)

[Formula 13]

(XIII)

Here, the signs U, V included in Formulae X to XIII are respectively integers of 0 to 2 which satisfy U+V=2 Moreover, $R^{54}$ to $R^{92}$ in Formulae X to XIII may be either identical or different, and are C1 to C20 divalent aliphatic or alicyclic hydrocarbon group or C6 to C18 divalent aromatic hydrocarbon group. Moreover, α and β in Formula XIII are integers of 0 to 5.

Moreover, among compounds satisfying Formulae X to XII, in particular, N1,N1,N7-tetramethyl-4-((trimethoxysilyl)methyl)-1,7heptane, 2-((hexyl-dimethoxysilyl)methyl)-N1,N1,N3,N3-2-pentamethylpropane-1,3-diamine, N1-(3-(dimethylamino)propyl-N3,N3-dimethyl-N1-(3-(trimethoxysilyl)propyl)propane-1,3-diamine and 4-(3-(dimethylamino)propyl)-N1,N1,N7,N7-tetramethyl-4-((trimethoxysilyl)methyl)heptane-1,7-diamine are preferable.

Among compounds satisfying Formula XIII, in particular, N,N-dimethyl-2-(3-(dimethoxymethylsilyl)propoxy)ethaneamine, N,N-bis(trimethylsilyl)-2-(3-(trimethoxysilyl)propoxy)ethaneamine, N,N-dimethyl-2-(3-(trimethoxysilyl)propoxy)ethaneamine and N,N-dimethyl-3-(3-(trimethoxysilyl)propoxy)propane-1-amine are preferable.

The hydrocarbyloxy silane compounds represented with the aforementioned general formulae (II) to (XIII) are preferably used as the modifier in the case where the modified polymer which may be contained in the polymer phase with the lowest peak temperature of tan δ temperature dispersion curve is produced via anionic polymerization.

Moreover, the hydrocarbyl oxysilane compounds represented with the general formulae (II) to (XIII) are preferably alkoxysilane compounds.

Modifiers preferable in the case where the modified polymer which may be contained in the polymer phase with the lowest peak temperature of tan δ temperature dispersion curve is obtained via anionic polymerization are specifically exemplified as at least one compound selected from 3,4-bis(trimethylsilyloxy)-1-vinylbenzene, 3,4-bis(trimethylsilyloxy)benzaldehyde, 3,4-bis(tert-butyldimethylsilyloxy)benzaldehyde, 2-cyanopyridine, 1,3-dimethyl-2-imidazolidinone or 1-methyl-2-pyrrolidone.

The modifier is preferably an amide moiety of a lithium amide compound used as a polymerization initiator in anionic polymerization.

This lithium amide compound is preferably exemplified as at least one compound selected from lithium hexamethyleneimide, lithium pyrrolizide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium-N-methylpiperazide, lithium ethylpropylamide, lithium ethylbutylamide, lithium ethylbenzylamide or lithium methylphenethylamide. For example, the modifier constituting the amide moiety of lithium hexamethyleneimide is hexamethyleneimine, the modifier constituting the amide moiety of lithium pyrrolizide is pyrrolidine, and the modifier constituting the amide moiety of lithium piperidide is piperidine.

Modifiers preferable in the case in the case where the modified polymer which may be contained in the polymer phase with the lowest peak temperature of tan δ temperature dispersion curve is obtained via coordination polymerization are exemplified as at least one compound selected from 2-cyanopyridine or 3,4-ditrimethylsilyloxy benzaldehyde.

Modifiers preferable in the case in the case where the modified polymer which may be contained in the polymer phase with the lowest peak temperature of tan δ temperature dispersion curve is obtained via emulsion polymerization are exemplified as at least one compound selected from 3,4-ditrimethylsilyloxy benzaldehyde or 4-hexamethylene iminoalkyl styrene. These modifiers preferably used in emulsion polymerization are preferably copolymerized during emulsion polymerization as a monomer containing nitrogen atom and/or silicon atom.

In the rubber composition of this disclosure, the aforementioned rubber component may further contain natural rubber (NR), ethylene-propylene copolymer, etc.

An example for the modified polymer which may be contained in the polymer phase with the lowest peak temperature of tan δ temperature dispersion curve is described hereinafter.

First, a low peak temperature main chain skeleton, which is a copolymer of styrene and 1,3-butadiene (microstructure: 10 mass % of styrene/40 mass % of a 1,3-butadiene derived vinyl bonding amount, base molecular weight (in terms of polystyrene): 180,000), was produced, modified by using [N,N-bis(trimethylsilyl)-(3-amino-1-propyl)](methyl)(diethoxy)silane (APMDEOS) with its terminals being anions, to obtain an APMDEOS modified polymer (modification efficiency: 70%, weight average molecular weight (Mw): 200,000).

<<Polymer Phase with Highest Peak Temperature of Tan δ Temperature Dispersion Curve>>

The peak temperature of tan δ temperature dispersion curve of the polymer phase with the highest peak temperature of tan δ temperature dispersion curve among the two or more polymer phases is not specifically limited and may be appropriately selected depending on the purpose as long as being −10° C. to 10° C.

If the peak temperature of tan δ temperature dispersion curve is lower than −10° C., the wet performance is significantly deteriorated, and if higher than 10° C., the loss performance is deteriorated.

The polymer phase with the highest peak temperature of tan δ temperature dispersion curve is not specifically limited and may be appropriately selected depending on the purpose as long as that its peak temperature of tan δ temperature dispersion curve is −10 to 10° C., but is preferably one constituted by an unmodified polymer. It is more preferable that the polymer phase with the highest peak temperature of tan δ temperature dispersion curve is constituted by an unmodified polymer, and the aforementioned polymer phase with the lowest peak temperature of tan δ temperature dispersion curve contains a modified polymer. This is because that it is possible to obtain more excellent low loss property and wear resistance.

It is preferable that the polymer phase with the lowest peak temperature of tan δ temperature dispersion curve contains a modified polymer, and the polymer phase with the highest peak temperature of tan δ temperature dispersion curve is constituted by an unmodified polymer. This is because that it is possible to obtain more excellent low loss property and wear resistance.

Moreover, a temperature difference between the polymer phase with the lowest peak temperature of tan δ temperature dispersion curve and the polymer phase with the highest peak temperature of tan δ temperature dispersion curve is not specifically limited and may be appropriately selected depending on the purpose, but 30° C. or more is preferable. This is because that if the temperature difference is less than 30° C., the polymers are dissolved in each other, which disables the performance improvement effect due to distribution.

Here, the polymer constituting the polymer phase with the highest peak temperature of tan δ temperature dispersion curve may be a diene based copolymer. Among those, a copolymer of a diene-based monomer and an aromatic vinyl compound is preferable, and a copolymer formed by polymerizing 50 to 80 mass % of a diene-based monomer and 20 to 50 mass % of an aromatic vinyl compound with respect to all the monomer components is more preferable.

The diene-based monomer used in polymerization of the polymer constituting the polymer phase with the highest peak temperature of tan δ temperature dispersion curve is exemplified as conjugated diene compounds such as 1,3-butadiene, isoprene, 1,3-pentadiene, 2,3-dimethylbutadiene, 2-phenyl-1,3-butadiene, 1,3-hexadiene and the like. Among these, 1,3-butadiene is specifically preferable. These conjugated diene compounds may be used singly or in a combination of two or more.

On the other hand, the aromatic vinyl compound as a monomer is exemplified as styrene, α-methylstyrene, 1-vinylnaphthalene, 3-vinyltoluene, ethylvinylbenzene, divinylbenzene, 4-cyclohexylstyrene, 2,4,6-trimethylstyrene, etc. Among these, styrene is specifically preferable. These aromatic vinyl compounds may be used singly or in a combination of two or more.

The polymerization method for obtaining the polymer constituting the polymer phase with the highest peak temperature of tan δ temperature dispersion curve may be any one of anionic polymerization, coordination polymerization and emulsion polymerization.

A molecular weight of the polymer constituting the polymer phase with the highest peak temperature of tan δ temperature dispersion curve is not specifically limited, but if a peak molecular weight is 50,000 or more, it is possible to obtain excellent breaking resistance and wear resistance, and if 700,000 or less, it is possible to obtain excellent processability. Further, in order to achieve the breaking resistance, the wear resistance and the processability at a high degree, a peak molecular weight of 100,000 to 350,000 is desirable. The peak molecular weight is a peak molecular weight (Mp) measured via gel permeation chromatography (GPC), in terms of polystyrene.

Filler

The filler is not specifically limited and may be appropriately selected depending on the purpose as long as containing at least a silica, and is exemplified as single silica, mixture of silica and carbon black, etc. Among the above, single silica is preferable.

The compounding amount of the filler per 100 parts by mass of the rubber component is not specifically limited and may be appropriately selected depending on the purpose as long as being 30 to 130 parts by mass.

If the compounding amount is less than 30 parts by mass, the wear resistance cannot be obtained sufficiently, and if more than 130 parts by mass, the low loss property cannot be obtained sufficiently.

A ratio among the filler which exists in the polymer phase with the lowest peak temperature of tan δ temperature dispersion curve (referred to as "filler distribution ratio to the low peak temperature polymer phase" as well) is not specifically limited and may be appropriately selected depending on the purpose as long as being 30 mass % or more.

If the ratio is less than 30 mass %, the low loss property and the wear resistance cannot be obtained sufficiently.

Here, the "filler which exists in the polymer phase with the lowest peak temperature of tan δ temperature dispersion curve" is determined by measuring a smooth surface of a sample cut with a microtome, by using an AFM (MFT-3D, made by ASYLUM RESEARCH), within a measurement range of 2 μm×2 μm. For example, in the case of measuring a system in which two polymer components are separated into two phases, based on a ternarized image obtained by converting with a histogram the two polymer components and the filler portion of the obtained AFM image into a ternarized image, the filler areas respectively included in the two polymer components are determined, and the distribution ratio of the filler is calculated from the filler total amount. In the case where the filler is on the interface of the two polymer components, the areas of the filler are divided by connecting two points where each polymer component and the filler contact each other.

The average aggregate area of the filler is not specifically limited and may be appropriately selected depending on the purpose as long as being 2100 $nm^2$ or less.

If the average aggregate area is more than 2100 $nm^2$, the low loss property cannot be obtained sufficiently.

Here, the "average aggregate area of the filler" is obtained by determining the aggregate area of the filler portion with an image obtained via FIB-SEM within a measurement range of 4 μm×4 μm, and calculating the average aggregate per unit area (2 μm×2 μm) of the filler portion in numerical average (arithmetic average) from the entire area and the number of aggregates of the filler portion. During the calculation, particles in contact with the edges (sides) of the image are not counted, and particles of 20 pixels or less are considered as noise and not counted.

<<Silica>>

The content of the silica with respect to the filler is not specifically limited and may be appropriately selected depending on the purpose, but 10 to 100 mass % is preferable.

This is because that if the content of the silica is within the preferable range, it becomes possible to improve the reinforcing effect and to improve the breaking resistance and the wear resistance of the rubber composition.

The type of the silica is not specifically limited, and may use either silicas of ordinary grade and special silicas subjected to surface treatment according to its usage. For example, from the viewpoint of improving the processability, the mechanical strength and the wear resistance, wet silica is preferably used.

<<Carbon Black>>

The carbon black is not specifically limited and may be appropriately selected depending on the purpose, but is preferably one of FEF, SRF, HAF, ISAF, SAF grade, more preferably one of HAF, ISAF, SAF grade. Moreover, the content of the carbon black is not specifically limited, and may be appropriately selected depending on the purpose.

Other Components

Other than the aforementioned rubber component and filler, the rubber composition of this disclosure may appropriately select and compound compounding agents ordinarily used in the rubber industry as long as not inhibiting the purpose of this disclosure, e.g., age resistor, silane coupling agent, vulcanization accelerator e.g., stearic acid), vulcanization accelerator aid (e.g., zinc oxide), vulcanizing agent (e.g., sulfur), softener (e.g., oil), wax, etc. These compounding agents are preferably commercially available ones. The rubber composition of this disclosure may be produced by compounding to the rubber component the filler, and various compounding agents appropriately selected if necessary, and kneading, warming, extrusion, etc.

(Tire)

The tire of this disclosure uses the rubber composition for a tread member. A tire using the rubber composition for a tread member, in particular, a tread rubber, is capable of achieving both the low loss property and the wear resistance at a high level. Here, the tire of this disclosure is not specifically limited as long as using the aforementioned rubber composition for any tread member, and may be produced with an ordinary method. Moreover, the gas filled in the tire may be ordinary air, air with adjusted oxygen partial pressure, or inactive gases such as nitrogen, argon, helium and the like.

EXAMPLES

This disclosure will be explained in further details in the following according to examples, while this disclosure is not limited to the following examples.

According to the following procedure, modified polymers A to C, a low tan δ peak temperature unmodified polymer and a high tan δ peak temperature unmodified polymer were produced. Here, positions of modified functional groups, types of modifiers, modification efficiency (%) and peak temperature of tan δ temperature dispersion curve (° C.) of each polymer are as shown in Table 1.

Further, the modification efficiency (%) was calculated with the following method.

By dissolving the modified polymer in toluene, and then precipitating in a large amount of methanol, amino group containing compounds which were not bonded to the modified polymer were separated from the rubber, and then dried. Polymers subjected to the present treatment were used as samples, to quantify their total amino group contents according to the "testing method for total amine values" according to JIS K7237. Next, the polymers subjected to the aforementioned treatment were used as samples, to quantify their contents of secondary amino groups and tertiary amino groups according to the "acetylacetone blocked method". O-nitrotoluene was used as a solvent to dissolve the samples, added with acetylacetone, and subjected to potential-difference titration with perchloric acid acetic acid solution. The primary amino group content was determined by subtracting the contents of secondary amino groups and tertiary amino groups from the entire amino group content, and the content of primary amino groups bonded to the polymer was determined by dividing the same with the polymer weight used in the analysis.

Moreover, regarding the tertiary amino group content, by dissolving the polymer in toluene, and then precipitating in a large amount of methanol, amino group containing compounds which were not bonded to the modified polymer were separated from the rubber, and then dried. The polymers subjected to the present treatment were used as samples, to quantify their tertiary amino group contents according to the "acetylation method". O-nitrotoluene+acetic acid was used as a solvent to dissolve the samples, added with formic acid/acetic anhydride mixed solution, and subjected to potential-difference titration with perchloric acid acetic acid solution. The content of tertiary amino groups bonded to the polymer was determined by dividing the tertiary amino group content with e weight used in the analysis.

(Production of Modified Polymer A)

A cyclohexane solution of 1,3-butadiene and a cyclohexane solution of styrene were added into a 800 milliliter pressure-resistant glass container subjected to drying and nitrogen substitution, such that 1,3-butadiene was 67.5 g and styrene was 7.5 g; 0.6 millimol of 2,2-ditetrahydrofurylpropane was added, and 0.8 millimol of n-butyl lithium was added; and then, polymerization was performed at 50° C. for 1.5 hours. With respect to the polymerization reaction system of which the polymerization conversion rate was approximately 100% at this time, 0.72 millimol of [N,N-bis(trimethylsilyl)-(3-amino-1-propyl)](methyl)(diethoxy)silane was added, and modification reaction was performed at 50° C. for 30 minutes. Afterward, 2 milliliter of an isopropanol 5 mass % solution of 2,6-di-t-butyl-p-cresol (BHT) was added to terminate the reaction, and the modified polymer A was obtained by drying with an ordinary method.

Moreover, as a result of measuring the microstructure of the obtained polymer, the bonding styrene amount was 10 mass %, the vinyl bonding amount of the butadiene moiety was 40%, and the peak molecular weight in terms of polystyrene obtained via gel permeation chromatography was 200,000.

(Production of Modified Polymer B)

A cyclohexane solution of 1,3-butadiene and a cyclohexane solution of styrene are added into a 800 milliliter pressure-resistant glass container subjected to drying and nitrogen substitution, such that 1,3-butadiene is 67.5 g and styrene is 7.52; 0.6 millimol of 2,2-ditetrahydrofurylpropane is added, and 0.8 millimol of n-butyl lithium is added; and then, polymerization is performed at 50° C. for 1.5 hours. With respect to the polymerization reaction system of which the polymerization conversion rate is approximately 100% at this time, 0.72 millimol of N-(1,3-dimethylbutylidene)-3-(triethoxysilyl)-1-propaneamine is added, and modification reaction is performed at 50° C. for 30 minutes. Afterward, 2 milliliter of an isopropanol 5 mass % solution of 2,6-di-t-butyl-p-cresol (BHT) is added to terminate the reaction, and the modified polymer B is obtained by drying with an ordinary method.

Moreover, as a result of measuring the microstructure of the obtained polymer, the bonding styrene amount is 10 mass %, the vinyl bonding amount of the butadiene moiety is 40%, and the peak molecular weight in terms of polystyrene obtained via gel permeation chromatography is 200,000.

(Production of Modified Polymer C)

A cyclohexane solution of 1,3-butadiene and a cyclohexane solution of styrene are added into a 800 milliliter pressure-resistant glass container subjected to drying and nitrogen substitution, such that 1,3-butadiene is 67.5 g and styrene is 7.5 g; 0.6 millimol of 2,2-ditetrahydrofurylpropane is added, and 0.8 millimol of n-butyl lithium is added; and then, polymerization is performed at 50° C. for 1.5 hours. With respect to the polymerization reaction system of which the polymerization conversion rate is approximately 100% at this time, 0.36 millimol of [N,N-bis(trimethylsilyl)-(3-amino-1-propyl)](methyl)(diethoxy)silane is added, and modification reaction is performed at 50° C. for 30 minutes. Afterward, 2 milliliter of an isopropanol 5 mass % solution of 2,6-di-t-butyl-p-cresol (BHT) is added to terminate the reaction, and the modified polymer C is obtained by drying with an ordinary method. Moreover, as a result of measuring the microstructure of the obtained polymer, the bonding styrene amount is 10 mass %, the vinyl bonding amount of the butadiene moiety is 40%, and the peak molecular weight in terms of polystyrene obtained via gel permeation chromatography is 200,000.

(Production of Modified Polymer D)

Modified polymer D was obtained similarly as production of modified polymer A, except that the cyclohexane solution of 1,3-butadiene was added such that 1,3-butadiene was 66.8 g (styrene was 0 g) instead of that "[a]cyclohexane solution of 1,3-butadiene and a cyclohexane solution of styrene were added . . . , such that 1,3-butadiene was 67.5 g and styrene was 7.5 g" in production of modified polymer A.

Moreover, as a result of measuring the microstructure of the obtained polymer, the bonding styrene amount was 0 mass %, the vinyl bonding amount of the butadiene moiety was 30%, and the peak molecular weight in terms of polystyrene obtained via gel permeation chromatography was 200,000.

(Production of Modified Polymer E)

Modified polymer E is obtained similarly as production of modified polymer A, except that 0.48 millimol of [N,N-bis(trimethylsilyl)-(3-amino-1-propyl)](methyl)(diethoxy)silane is added, instead of that "0.72 millimol of [N,N-bis(trimethylsilyl)-(3-amino-1-propyl)](methyl)(diethoxy)silane is added" in production of modified polymer A.

Moreover, as a result for measuring the microstructure of the obtained polymer, the bonding styrene amount is 10 mass %, the vinyl bonding amount of the butadiene moiety is 40%, and the peak molecular weight in terms of polystyrene obtained via gel permeation chromatography was 200,000.

(Production of Low Tan δ Peak Temperature Unmodified Polymer)

A cyclohexane solution of 1,3-butadiene and a cyclohexane solution of styrene were added into a 800 milliliter pressure-resistant glass container subjected to drying and nitrogen substitution, such that 1,3-butadiene was 67.5 g and styrene was 7.5 g; 0.6 millimol of 2,2-ditetrahydrofurylpropane was added, and 0.8 millimol of n-butyl lithium was added; and then, polymerization was performed at 50° C. for 1.5 hours. The polymerization conversion rate in this case was approximately 100%.

Moreover, as a result for measuring the microstructure of the obtained polymer, the bonding styrene amount was 10 mass %, the vinyl bonding amount of the butadiene moiety was 40%, and the peak molecular weight in terms of polystyrene obtained via gel permeation chromatography was 200,000.

(Production of High Tan δ Peak Temperature Unmodified Polymer)

A cyclohexane solution of 1,3-butadiene and a cyclohexane solution of styrene were added into a 800 milliliter pressure-resistant glass container subjected to drying and nitrogen substitution, such that 1,3-butadiene was 45 g and styrene was 30 g; 0.6 millimol of 2,2-ditetrahydrofurylpropane was added, and 0.6 millimol of n-butyl lithium was added; and then, polymerization was performed at 50° C. for 3.0 hours.

TABLE 1

| | Positions of functional groups | Type of modifier | Modification efficiency (mass %) |
|---|---|---|---|
| Modified polymer A | Terminal | N,N-bis(trimethylsilyl)-(3-amino-1-propyl)(methyl)(diethoxy)silane | 74 |
| Modified polymer B | Terminal | N-(1,3-dimethylbutylidene)-3-(triethoxysilyl)-1-propaneamine | 75 |
| Modified polymer C | Terminal | N,N-bis(trimethylsilyl)-(3-amino-1-propyl)(methyl)(diethoxy)silane | 37.5 |
| Modified polymer D | Terminal | N,N-bis(trimethylsilyl)-(3-amino-1-propyl)(methyl)(diethoxy)silane | 74 |
| Modified polymer E | Terminal | N,N-bis(trimethylsilyl)-(3-amino-1-propyl)(methyl)(diethoxy)silane | 48 |
| Low tanδ peak temperature unmodified polymer | — | — | — |
| High tanδ peak temperature unmodified polymer | — | — | — |

Examples 1 and 4 and Comparative Example 1

By using the modified polymers A and D, the low tan δ peak temperature unmodified polymer and the high tan δ peak temperature unmodified polymer in the aforementioned Table 1 to prepare the rubber composition according to the formulation as shown in Table 2, each sample of the examples and the comparative example was obtained.

With respect to each sample of the examples and comparative example, evaluation was performed regarding: (1) the filler distribution ratio to the polymer phase with the lowest peak temperature of tan δ temperature dispersion curve (mass %), (2) the average aggregate area of the filler (nm²), (3) the domain circumference length of the polymer phase with the lowest peak temperature of tan δ temperature dispersion curve (μm/μm²), (4) the low loss property (tan δ), (5) the wear resistance and (6) the breaking stress.

(1) Filler distribution ratio to polymer phase with lowest peak temperature of tan δ temperature dispersion curve (mass %)

Measured by measuring a smooth surface of the sample cut with a microtome, by using an AFM (MFP-3D, made by ASYLUM RESEARCH), within a measurement range of 2 μm×2 μm. Based on a ternarized image obtained by converting with a histogram the two polymer components and the filler portion of the obtained AFM image into a ternarized image, the filler areas respectively included in the two polymer components were determined, and the distribution ratio of the filler was calculated from the filler total amount. In the case where the filler is on the interface of the two polymer components, the areas of the filler were divided by connecting two points where each polymer component and the filler contact each other. The result was as shown in Table 2.

(2) Average Aggregate Area of Filler (nm²)

The "average aggregate area of the filler" was obtained by, for example, determining the aggregate area of the filler portion with an image obtained via FIB-SEM within a measurement range of 4 μm×4 μm, and calculating the average aggregate per unit area (2 μm×2 μm) of the filler portion in numerical average (arithmetic average) from the entire aggregate area and the number of aggregates of the filler portion. During the calculation, particles in contact with the edges (sides) of the image were not counted, and particles of 20 pixels or less were considered as noise and not counted. The result was as shown in Table 2.

(3) Domain Circumference Length of Polymer Phase with Lowest Peak Temperature of Tan δ Temperature Dispersion Curve (μm/μm²)

The domain circumference length refers to a length of an interface of polymer phases, and is a value obtained by ternarizing an image obtained via AFM, then removing a part corresponding to the filler, and totalizing lengths of remaining polymer phase interfaces. The calculation was performed with the removed part compensated if the filler was added into one polymer phase, and with the same remaining removed if the filler was on the interface of two polymer components (polymer phases), The result was as shown in Table 2.

(4) Low Loss Property (tan δ)

With respect to each sample, the loss tangent (tan δ was measured by using a viscoelasticity measurement apparatus (made by Rheometrics Inc.) at a temperature of 50° C., a strain of 10% and a frequency of 15 Hz. The obtained value of tan δ was represented as an index, with the value of Comparative Example 1 as 100. The result was as shown in Table 2. Here, a smaller index value of the low loss property shows an excellent low loss property.

(5) Wear Resistance

With respect to each sample, by using a Lambourn abrasion test machine manufactures by Ueshima Seisakusho Co, Ltd., the abrasion amount at room temperature was measured. The reciprocal of the obtained value of abrasion amount was represented as an index, with the value of Comparative Example 1 as 100. The result was as shown in Table 2. A larger index value shows a less abrasion amount and an excellent wear resistance.

(6) Breaking Stress

With respect to each sample, tensile test was performed at room temperature according to JIS-K6251, and the breaking stress of vulcanized rubber composition was measured and represented as an index, with the value of Comparative Example 1 as 100. The result was as shown in Table 2. Here, a larger index value of breaking stress shows an excellent breaking stress.

Examples 2, 3 and 5 and Comparative Example 2

With respect to each sample of the examples and comparative examples according to the formulation as shown in Table 2, evaluation is performed regarding: (1) the filler distribution ratio to the polymer phase with the lowest peak temperature of tan δ temperature dispersion curve (mass %), (2) the average aggregate area of the filler (nm²), (3) the domain circumference length of the polymer phase with the lowest peak temperature of tan δ temperature dispersion curve (μm/μm²), (4) the low loss property (tan δ), (5) the wear resistance and (6) the breaking stress.

TABLE 2

| | | | Comparative Example 1 | Comparative Example 2 | Example 1 | Example 2 | Example 3 | Example 4 | Example 5 |
|---|---|---|---|---|---|---|---|---|---|
| Formation (Parts by mass) | First formation | Low tanδ peak temperature unmodified polymer | 50 | 100 | — | — | — | — | — |
| | | Modified polymer A | — | — | 50 | — | — | — | — |
| | | Modified polymer B | — | — | — | 50 | — | — | — |
| | | Modified polymer C | — | — | — | — | 50 | — | — |
| | | Modified polymer D | — | — | — | — | — | 50 | — |
| | | Modified polymer E | — | — | — | — | — | — | 50 |
| | | High tanδ peak temperature unmodified polymer | 50 | — | 50 | 50 | 50 | 50 | 50 |
| | | Process oil*1 | 10 | 20 | 10 | 10 | 10 | 10 | 10 |
| | | Carbon black | 4 | 8 | 4 | 4 | 4 | 4 | 4 |
| | | Silica*2 | 55 | 110 | 55 | 55 | 55 | 55 | 55 |
| | | Silane coupling agent*3 | 5.5 | 11 | 5.5 | 5.5 | 5.5 | 55 | 5.5 |
| | | Stearic acid | 2 | 4 | 2 | 2 | 2 | 2 | 2 |
| | | Age resistor*4 | 1 | 2 | 1 | 1 | 1 | 1 | 1 |
| | | Wax | 2 | 4 | 2 | 2 | 2 | 2 | 2 |
| | Second formation | Fast masterbatch | — | 128.2 | — | — | — | — | — |
| | | High tanδ peak temperature unmodified polymer | — | 50.0 | — | — | — | — | — |

TABLE 2-continued

|  |  | Comparative Example 1 | Comparative Example 2 | Example 1 | Example 2 | Example 3 | Example 4 | Example 5 |
|---|---|---|---|---|---|---|---|---|
| Final formation | Zinc oxide | 2.5 | 2.5 | 2.5 | 2.5 | 2.5 | 2.5 | 2.5 |
|  | Vulcanization accelerator*5 | 1.2 | 1.2 | 1.2 | 1.2 | 1.2 | 1.2 | 1.2 |
|  | Vulcanization accelerator*6 | 1.2 | 1.2 | 1.2 | 1.2 | 1.2 | 1.2 | 1.2 |
|  | Vulcanization accelerator*7 | 1.0 | 1.0 | 1.0 | 1.0 | 1.0 | 1.0 | 1.0 |
|  | Sulfur | 2 | 2 | 2 | 2 | 2 | 2 | 2 |
| Mixing method |  | Ordinary | Masterbatch | Ordinary | Ordinary | Ordinary | Ordinary | Ordinary |
| Low tanδ peak temperature |  | −45 | −45 | −43 | −43 | −43 | −55 | −43 |
| High tanδ peak temperature |  | −8 | −8 | −8 | −8 | −8 | −8 | −8 |
| Morphology | Filler distribution ratio to polymer phase with lowest peak temperature of tanδ temperature dispersion curve (mass %) | 23 | 30 | 40 | 40 | 34 | 40 | 36 |
|  | Average aggregate area (nm$^2$) | 2200 | 2200 | 1700 | 1700 | 2000 | 1700 | 1900 |
|  | Domain circumference length of the polymer phase with the lowest peak temperature of tanδ temperature dispersion curve (μm/μm$^2$) | 18.75 | 22.5 | 30 | 30 | 30 | 30 | 30 |
| Evaluation result | Low loss property (tanδ) (the less, the better) | 100 | 95 | 73 | 74 | 81 | 61 | 79 |
|  | Wear resistance (the more, the better) | 100 | 107 | 119 | 119 | 109 | 123 | 112 |
|  | Breaking stress (the more, the better) | 100 | 79 | 101 | 102 | 96 | 93 | 97 |

The values of each formation in Table 2 are parts by mass per 100 parts by mass of the rubber component.
*1Process Oil, A/O MIX, made by Sankyo Yuka Kogyo K.K.
*2Nipsil AQ, made by Tosoh Silica Corporation
*3bis-[γ-(triethoxysilyl)-propyl]-tetrasulfide, Si69, made by Evonik Degussa
*4N-(1,3-dimethylbutyl)-N'-phenyl-p-phenylenediamine
*5benzothiazyl disulfide (MBTS in short), Nocceler DM-P, made by Ouchi Shinko Chemical Industrial Co., Ltd.
*6Diphenylguanidine (DPG in short), trade name "Nocceler D", made by Ouchi Shinko Chemical Industrial Co., Ltd.
*7N-(tert-butyl)-2-benzothiazole sulfonamide (TBBS in short), Sanceler NS-G From the result in Table 2, it is understood that as compared to the samples of the rubber compositions of Comparative Examples 1 and 2, the samples of the rubber compositions of Examples 1 to 5, of which the peak temperature of tan δ temperature dispersion curve of the polymer phase with the lowest peak temperature of tan δ temperature dispersion curve is −110° C. to −20° C., the peak temperature of tan δ temperature dispersion curve of the polymer phase with the highest peak temperature of tan δ temperature dispersion curve is −10° C. to 10° C., the compounding amount of the filler is 30 to 130 parts by mass per 100 parts by mass of the rubber component, the filler distribution ratio to the polymer phase with the lowest peak temperature of tan δ temperature dispersion curve is 30 mass % or more, and the average aggregate area of the filler is 2100 nm$^2$ or less, are capable of achieving both the low loss property (tan δ) and the wear resistance at a high level.

Figure 3A:
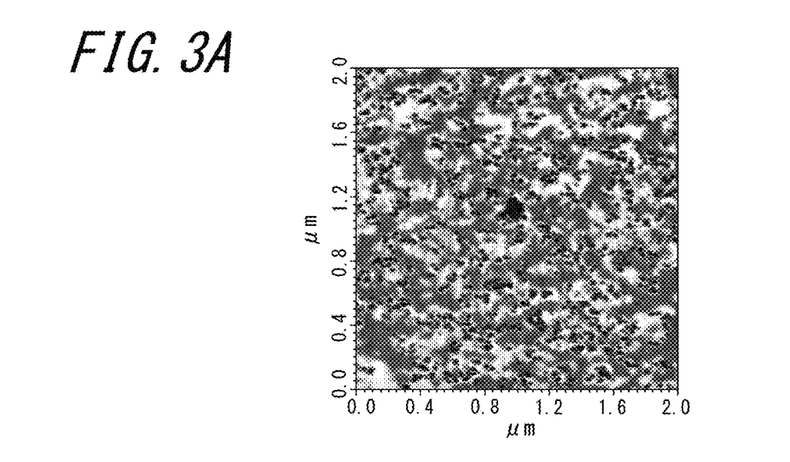
FIG. 3A is an Atomic Force Microscope (AFM) photo showing the distribution state of a filler, and is a photo of the rubber composition prepared in Example 1.
Figure 3B:
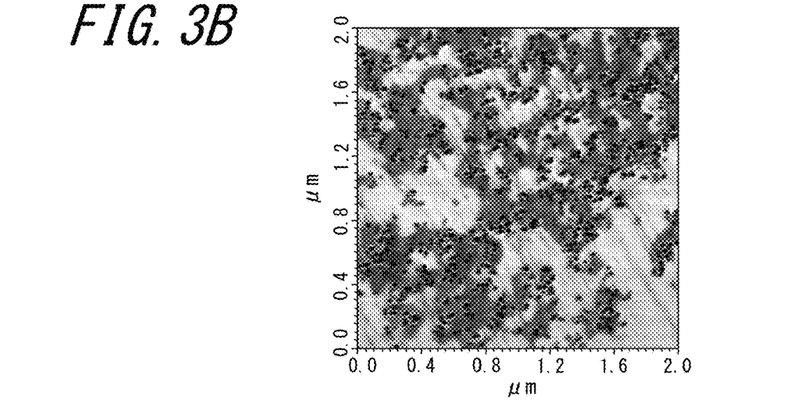
FIG. 3B is an Atomic Force Microscope (AFM) photo showing the distribution state of a filler, and is a photo of the rubber composition prepared in Comparative Example 1.
Figure 3C:
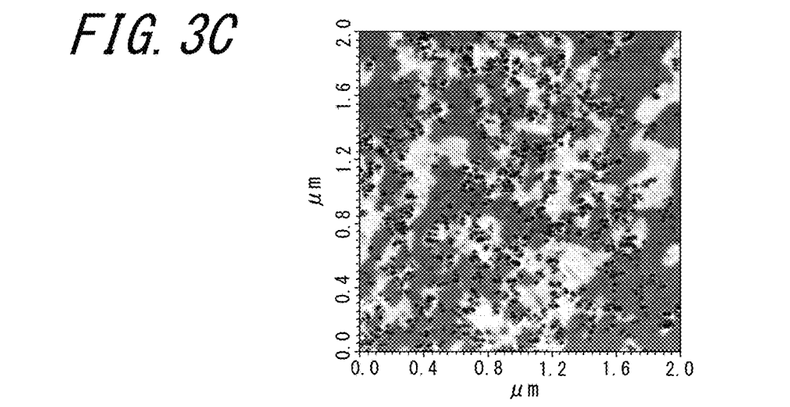
FIG. 3C is an Atomic Force Microscope (AFM) photo showing the distribution state of a filler, and is a photo of the rubber composition prepared in Comparative Example 2.

FIG. 3 are Atomic Force Microscope (AFM) photos showing the distribution state of the filler, where FIG. 3A is a photo of the rubber composition prepared in Example 1, FIG. 3B is a photo of the rubber composition prepared in Comparative Example 1, and FIG. 3C is a photo of the rubber composition prepared in Comparative Example 2.

INDUSTRIAL APPLICABILITY

According to this disclosure, it is possible to provide a rubber composition capable of achieving both the low loss property and the wear resistance at a high degree, and to provide a tire capable of achieving both the low loss property and the wear resistance at a high degree by using such rubber composition for a tread member.

The invention claimed is:

1. A rubber composition comprising a rubber component containing 2 or more polymer components and a filler containing at least a silica, wherein:
the rubber component is separated into two or more polymer phases with different peak temperatures of tan δ temperature dispersion curve;
a peak temperature of tan δ temperature dispersion curve of a polymer phase with a lowest peak temperature of tan δ temperature dispersion curve among the two or more polymer phases is −110° C. to −20° C.;
a peak temperature of tan δ temperature dispersion curve of a polymer phase with a highest peak temperature of tan δ temperature dispersion curve among the two or more polymer phases is −10° C. to 10° C.;
a compounding amount of the filler per 100 parts by mass of the rubber component is 30 to 130 parts by mass;
30 mass % or more of the filler exists in the polymer phase with the lowest peak temperature of tan δ temperature dispersion curve; and
the filler has an average aggregate area of 2100 nm$^2$ or less.

2. The rubber composition according to claim 1, wherein:
a domain circumference length of the polymer phase with the lowest peak temperature of tan δ temperature dispersion curve is 25 μm/μm$^2$ or more.

3. The rubber composition according to claim 1, wherein:
the polymer phase with the lowest peak temperature of tan δ temperature dispersion curve contains a modified polymer; and
the polymer phase with the highest peak temperature of tan δ temperature dispersion curve is constituted by an unmodified polymer.

4. The rubber composition according to claim 1, wherein:
a content of a polymer constituting the polymer phase with the lowest peak temperature of tan δ temperature dispersion curve with respect to the rubber component is 50 to 90 mass %.

5. The rubber composition according to claim 3, wherein:
functional groups in the modified polymer are modified functional groups having interactivity with the filler.

6. The rubber composition according to claim 5, wherein:
the functional groups are nitrogen containing functional group, silicon containing functional group or oxygen containing functional group.

7. The rubber composition according to claim 3, wherein:
modification efficiency in the modified polymer is 30% to 100%.

8. The rubber composition according to claim 1, wherein:
the polymer phase with the lowest peak temperature of tan δ temperature dispersion curve is a polymer or copolymer obtained by polymerizing 80 to 100 mass % of a diene-based monomer and 0 to 20 mass % of an aromatic vinyl compound with respect to all monomer components.

9. The rubber composition according to claim 8, wherein:
the diene-based monomer is 1,3-butadiene.

10. The rubber composition according to claim 8, wherein:
the aromatic vinyl compound is styrene.

11. A tire using the rubber composition according to claim 1 for a tread member.

12. The rubber composition according to claim 2, wherein:
the polymer phase with the lowest peak temperature of tan δ temperature dispersion curve contains a modified polymer; and
the polymer phase with the highest peak temperature of tan δ temperature dispersion curve is constituted by an unmodified polymer.

13. The rubber composition according to claim 2, wherein:
a content of a polymer constituting the polymer phase with the lowest peak temperature of tan δ temperature dispersion curve with respect to the rubber component is 50 to 90 mass %.

14. The rubber composition according to claim 2, wherein:
the polymer phase with the lowest peak temperature of tan δ temperature dispersion curve is a polymer or copolymer obtained by polymerizing 80 to 100 mass % of a diene-based monomer and 0 to 20 mass % of an aromatic vinyl compound with respect to all monomer components.

15. A tire using the rubber composition according to claim 2 for a tread member.

16. The rubber composition according to claim 3, wherein:
the polymer phase with the lowest peak temperature of tan δ temperature dispersion curve is a polymer or copolymer obtained by polymerizing 80 to 100 mass % of a diene-based monomer and 0 to 20 mass % of an aromatic vinyl compound with respect to all monomer components.

17. A tire using the rubber composition according to claim 3 for a tread member.

18. The rubber composition according to claim 4, wherein:
the polymer phase with the lowest peak temperature of tan δ temperature dispersion curve is a polymer or copolymer obtained by polymerizing 80 to 100 mass % of a diene-based monomer and 0 to 20 mass % of an aromatic vinyl compound with respect to all monomer components.

19. A tire using the rubber composition according to claim 4 for a tread member.

20. The rubber composition according to claim 5, wherein:
modification efficiency in the modified polymer is 30% to 100%.

* * * * *